United States Patent Office 3,188,203
Patented June 8, 1965

3,188,203
BRAZING ALLOYS
Robert L. Peaslee, Royal Oak, and Lester E. Oliphant, Detroit, Mich., assignors to Wall Colmonoy Corporation, Detroit, Mich., a corporation of Delaware
No Drawing. Filed Sept. 3, 1957, Ser. No. 681,443
7 Claims. (Cl. 75—170)

This is a continuation-in-part of application Serial No. 449,264, filed August 11, 1954, now abandoned.

The present invention relates to brazing alloys and to the art of brazing. More specifically, the present invention relates to the brazing or bonding together of high-melting, corrosion- and heat-resistant metals and alloys and articles produced thereby.

The art of brazing, as heretofore commonly known, has employed relatively low melting metals and alloys for joining the surfaces of copper, iron, steel, and other common metals. The alloy commonly used for copper is a solder composed of about two parts lead and five parts tin while for iron or steel, a brass-like alloy of copper, tin, lead and/or zinc is utilized. However, in recent years, the advent of the jet and rocket engines, the atomic and hydrogen age, etc. has demanded methods of joining high-melting, corrosion- and heat-resistant alloys such as the stainless steels; stainless steel clad copper; "Stellite" or "Vitallium" high cobalt alloys; Inconel; silicon steels; and many others. The fabrication of jet, turbo-jet, and rocket engine parts, and liquid-metal or liquid-salt heat exchangers, for example, has required brazed or soldered joints which will withstand continuous exposure to temperatures of 1400° F. to 2000° F. or more. There are several known brazing alloys which will withstand these temperatures but which do not have either good hot strength, good corrosion resistance or good wetting properties. In many cases, difficulty has been encountered with wetting of the surfaces to be brazed by these high temperature brazing alloys. Many of the newer heat-resistant stainless steels which contain small proportions of titanium, aluminum, columbium and other metals are especially difficult to braze by known methods and materials.

It has been proposed heretofore that nickel-phosphorus alloys were useful for brazing parts to be subjected to corrosive and oxidizing atmospheres at elevated temperatures, and for certain types of such applications these alloys are satisfactory. It has been found, however, that nickel-phosphorus alloys do not possess the highest degree of, or in some cases the necessary degree of, oxidation and corrosion resistance and ductility as the temperature of use exceeds about 1400° F.

It is therefore the principal object of this invention to provide a series of modified nickel-phosphorus alloys which are improved in the respects that they possess a melting point in the range of 1600° F. to 1850° F. and oxidation resistance and ductility characteristics which are superior to those possessed by nickel-phosphorus alloys.

Another object of this invention is to provide a method for brazing or bonding together alloys which have high melting points, good resistance to corrosion and oxidation at elevated temperatures and particularly alloys containing nickel and chromium and which may contain minor proportions of other alloying ingredients such as molybdenum, tungsten and the like.

A still further object of this invention is to provide new and improved articles which are formed by joining metals with the improved alloys of this invention.

In accordance with this invention it has been found that the above and related objects are realized by alloying certain proportions of at least one metal selected from the group consisting of chromium, manganese, molybdenum and silicon with nickel and phosphorus and in which the nickel constitutes by weight, a minimum of 50%, the phosphorus is between about 3% and about 15% and the other alloying metal, or admixtures thereof, comprises a maximum of 30%.

The improved alloys of this invention result when they contain about 2% to about 20% chromium, about 1% to about 20% manganese, about .5% to about 18% molybdenum and about 1% to about 12% silicon. Admixtures of the alloying ingredient selected from the group consisting of chromium, manganese, molybdenum and silicon are preferably restricted to two constituents and it will thus be understood that this invention contemplates ternary and quaternary alloys. When more than one of the metals from the group consisting of chromium, manganese, molybdenum and silicon is present in addition to phosphorus and nickel in the alloy, the only requirement which must be met is that the final alloy have a melting point within the range of about 1600° F. and about 1850° F. and the sum of the selected two constituents be below about 30% by weight of the final alloy. The metals chromium, manganese, molybdenum and silicon are each capable of conferring properties on the resulting alloy which are specifically different but which have certain common characteristics as well. Each of the metals chromium, manganese, molybdenum and silicon has the characteristic of being capable of alloying with a nickel-phosphorus alloy to form a low melting, or eutectic, constituent which confers upon the resulting alloy a melting point within the range of between about 1600° F. and 1850° F. This common low melting or eutectic constituent, in addition to conferring the above indicated melting point property, confers improved resistance to oxidation on the base nickel-phosphorus alloy so that the resulting alloys have improved oxidation resistance at temperatures above 1400° F. It will also be understood that by varying the quantity of the particular alloying ingredient it is possible to thereby affect the quantity of oxidation or corrosion resistance, or strength or modification of flow property which is conferred on the final alloy. To illustrate this point, the effect of adding chromium to nickel-phosphorus, generally stated, is to increase the melting point slightly, to increase the high temperature oxidation resistance markedly, and as the proportion of chromium approaches the upper limit of 20% to decrease the ease with which the alloy flows during brazing. The addition of manganese increases the melting point slightly, improves the flow property of the alloy and as the upper limit of 20% is approached has a tendency to decrease the resistance to oxidation at high temperatures. The addition of silicon slightly increases the melting point, increases high temperature resistance to oxidation and chemical corrosion and the addition of molybdenum has the effect of slightly raising the melting point, improving strength and ductility and increasing the resistance to chemical corrosion at elevated temperatures. From these generalizations it will be apparent that specific alloy compositions can be easily prepared by minor alterations of the quantity of the selected alloying ingredient which is needed to confer the specific properties required by the particular application.

Such alloys have the ability to wet the surfaces of a wide variety of base metals without the aid of fluxes, to form brazed joints which are heat resistant, have good strength and ductility at elevated temperatures and excellent resistance to oxidation from air and resistance to corrosion by some chemicals at temperatures of about 1400° F. to 1800° F. or higher. The brazed joints possess excellent resistance to liquid metals, liquid salts, etc., at high temperatures. The brazing operation with these alloys does not require careful control of the contaminants in, or the dew point of, the brazing atmosphere since brazing may be carried out with heat supplied by an ordinary torch, a carbon arc or a muffle-type furnace. Moreover, the resulting brazed joint need not be carefully cooled and annealed to avoid brittleness in cracking. In some cases it is believed that the brazing operation causes a fusing or dissolving away of a portion of at least some of the base metals which are brazed therewith and that a new alloy is formed in situ in the brazed joint. In other cases, there is little evidence of diffusion of base metal or grain boundary penetration by the brazing alloy.

A wide variety of metals and alloys can be joined to themselves and to other metals by the brazing alloy and method of this invention. Illustrative metals include the stainless steels; chrome steels; ordinary carbon steel; soft iron; Inconel and other alloys containing major proportions of either nickel or chromium or both; titanium and its alloys and titanium-bearing steels; metallic carbides such as tungsten and tantalum carbides; copper and copper clad with corrosion-resisting metals such as stainless steel; high cobalt-iron alloys; and many others.

The alloys of this invention can be sasisfactorily formed by first preparing a nickel-phosphorus alloy by the pyrometric reaction of a mixture of nickel and a phosphorus bearing salt. It is also possible, although somewhat less desirable than the above stated method, to carefully fuse elemental nickel and elemental phosphorus under hydrogen, argon or other inert atmosphere. The reaction product of the nickel and phosphorus bearing salt is a nickel phosphorus alloy which can be admixed with the desired proportion of one or more of the alloying constituents from the group consisting of chromium, manganese, molybdenum and silicon by admixing the quantities of each which are necessary to produce the finally desired alloy. In some cases it may be necessary to incorporate additional quantities of nickel with the other alloying ingredient or ingredients in order to form final alloys having the lower percentages of phosphorus within the above indicated range of 3% to 15% phosphorus.

The method of this invention is carried out by placing an appropriate quantity of the brazing alloy adjacent the surfaces, or at the juncture of the metal parts, to be joined, and heating to a temperature sufficient to melt the nickel-phosphorus alloy and cause it to flow between the surfaces of parts to be joined. No flux is required in this method, but flux may be used, if desired. Subsequent cooling solidifies the alloy in the joint and firmly bonds the two surfaces or parts together. Such a bond frequently has a tensile strength in the range of 40,000 to 60,000 lbs./sq. in. The alloy is preferably in finely-divided form to facilitate its melting. The finely-divided alloy, that is about 60 to 65 mesh or smaller, may be utilized as such in the powdered form. More conveniently, it may be bound together with a suitable plastic binder in sheet, strip, filament, or rod form and as such adhered to or around the joint area. A flexible, plastic rod or filament type of composition in which the finely-divided alloy is dispersed in polyethylene or other carbon-hydrogen plastic, which decomposes without liberating oxidizing gases, can be molded by hand to fit the most intricate of joints and shapes. The plastic binder volatilizes without residue during heat-up leaving the partially sintered or adhered brazing alloy particles in place around the joint. Similar compositions are more fully disclosed in the copending application of Robert L. Peaslee, Serial No. 310,539, filed September 19, 1952 now Patent No. 2,833,030.

The brazing temperature employed must be above the melting point of the brazing alloy being used and below that of the base metals being joined. In general, this means that the brazing temperature must be above about 1750° F., and preferably above 1800° F. Depending on the metals being joined, brazing temperatures between 1850° F. and 2250° F. usually are employed. In most cases, there is little advantage in employing brazing temperatures of more than 50° F. to 150° F. higher than the actual melting point of the brazing alloy.

As stated hereinabove, the brazing can be carried out with any apparatus capable of furnishing the required heat. An oxy-acetylene or hydrogen torch or open gas-fired retort or muffle may sometimes be employed to advantage on small parts. For most consistent results, especially with larger parts, the use of a sealed retort in a gas or electric-fired furnace insures even heat and more complete and speedier melting of the nickel-phosphorus alloy. The retort can be provided with a pure dry hydrogen atmosphere which reduces oxidation and insures ready wetting of the surfaces to be brazed by the molten brazing alloy. The tendency of some metals and alloys to form tenaciously adhering self-protective oxide films is greatly reduced in a pure hydrogen atmosphere having a dew point of −50° F. or less.

The surfaces or metal parts to be joined need only be as clean and as free from oxide or scale as is ordinary in any brazing operation. When in this condition, the usual fluxes are not required.

The invention will now be described more fully with reference to a number of specific examples, which are intended to be illustrative only. In the examples and elsewhere herein, unless otherwise specified, proportions are expressed as percent by weight.

*Example 1*

A Bureau of Standards standard electroplating alloy containing 88% nickel and 12% phosphorus was utilized as a brazing alloy to join two pieces to Type 304 stainless steel. Two strap-like pieces of the stainless steel ⅜ inch wide, 0.032 inch thick and 5 inches long were aligned to form a T-shape, a quantity of the powdered 88/12 nickel-phosphorus alloy placed around the intersection and the assembly heated in a sealed retort having a pure dry hydrogen atmosphere for thirty minutes at a temperature in the range of 1850° F. to 2020° F. The sealed retort and its contents were then allowed to cool in air down to room temperature. Upon inspection, the brazed joint was found to be uniform and smooth with a satisfactory fillet along the entire joint. The joint showed excellent wetting and flow. A similar specimen brazed 20 minutes at 2020° F. in pure dry hydrogen had a joint shear strength of 40,000 lbs./sq. in. at room temperature. Other specimens prepared in this manner showed no evidence of scaling or pitting in the joint after heating in air for 72 hours at 1600° F. After 125 hours at the latter temperature, the joint area was unchanged except for a light oxide film. After only 72 hours, the stainless steel base metal itself showed a thin loose scale and oxide film. Other specimens were subjected to heating in air for varying periods of time at 1400° F. to determine the maximum time that the joint would resist oxidation, and it was found that oxidation failure resulted after 500 hours in air. When other specimens were given a ductility test, consisting of anchoring one end of a 5 inch long T specimen in a fixture and then twisting the other end, it was found that fracture occurred after the specimen had been twisted 360 degrees as a maximum.

*Example 2*

An alloy containing 10.8% phosphorus, 9.2% silicon and the balance nickel, which alloy had a melting point estimated to be between about 1650° F. and 1850° F., was utilized to braze 5 inch T test pieces of Type 304 stainless steel (about 18% chromium=8% nickel). The brazing of the stainless steel was carried out at 2100° F. to 2150° F. in a retort having a pure dry hydrogen atmosphere with the specimen at heat for about 15 minutes. On visual examination, the joint showed excellent flow and wetting between the brazing alloy and the stainless steel with a moderate sized fillet on both sides and on the entire length of the joint. There was no evidence of undercutting. When given a ductility test, which consisted of anchoring one end of the brazed stainless steel T specimen in a fixture and then twisting the other end until fracture occurred, and if fracture did not occur after 720 degrees of twist, bending the specimen until fracture occurred, the stainless steel specimen of this example withstood a total of 720° of twist plus 50° bend before cracking. This was taken to indicate a considerable degree of ductility in the joint area. The shear strength of a similar Type 304 specimen brazed as above with the silicon-containing nickel-phosphorus alloy was above 47,000 lbs./sq. in. at room temperature.

Another phosphorus-silicon-nickel alloy was prepared containing 4.5% silicon, 6.25% phosphorus and the balance nickel, and this alloy had a melting range between 1650° F. and 1800° F., as determined by cooling curves. This alloy was utilized to braze 5 inch T test pieces of Type 304 stainless steel at a temperature of about 1850° F. in a retort having a pure dry hydrogen atmosphere for about 15 minutes. The resulting joint was comparable to that obtained with the alloy above described in this example and when tested in a similar manner fracture did not occur until after 720° of twist plus 50° of bend. The shear strength was comparable and the testing of a successive number of specimens for oxidation resistance at successively higher temperatures showed that the specimens were capable of resisting oxidation for 500 hours at a temperature as high as 1650° F.

*Example 3*

An alloy containing 2.75% chromium, 9.6% phosphorus and the balance nickel, which had an observed melting point between 1610° F. and 1700° F., was utilized to prepare a standard 3.5 inch T specimen of Type 304 stainless steel. Brazing was carried out at 1800° F. in pure dry hydrogen with the specimen at heat for about 15 minutes. On visual examination the joint was found to be smooth and uniformly filled with excellent wetting and flow and with a moderate-sized fillet on both sides and along the entire length of the joint. In the ductility test, the specimen withstood 540° twist before fracture. On microscopic examination, with the specimen etched in a solution containing cupric sulfate, hydrochloric acid and water (so as to darken the stainless steel and outline the grain boundaries) the specimen showed an excellent bond, slight diffusion and no grain boundary penetration.

Still another specimen of stainless steel was brazed using an alloy containing 13% chromium, 10.2% phosphorus, and the balance nickel. The melting point of this alloy was between 1610° F. and 1650° F. The brazing was carried out in pure dry hydrogen at 1700° F. with the specimen 15 minutes at heat. The results were the same as with the 2.75% chromium alloy above except that the joint appeared to be slightly more ductile, since it withstood 720° twist and 60° bend before cracking. A plurality of specimens tested for oxidation resistance determined that the brazed joint withstood oxidation in air at 1575° F. for 500 hours before deteriorating.

*Example 4*

An alloy containing 11% phosphorus, 7.5% manganese and the balance nickel, which had an observed melting point between 1600° F. and 1700° F., was utilized to braze a Type 304 stainless steel 5 inch T specimen. Brazing was carried out in pure dry hydrogen at 1850° F. with the specimen at heat for 15 minutes. The brazing alloy showed somewhat better wetting and flow characteristics than the alloys of Examples 2 and 3, and it was indicated that this manganese-containing brazing alloy might also be useful for melt coating, metal spraying, or other metallizing processes.

*Example 5*

An alloy containing 10% phosphorus, 4% molybdenum and the balance nickel, having an observed melting point between 1650° F. and 1800° F., was utilized to braze Type 304 stainless steel 5 inch T specimens. The brazing was effected in pure dry hydrogen at 1850° F. to 1900° F. with the specimen being at heat for about 15 minutes. The brazing alloy had excellent wetting and flow characteristics and when subjected to the ductility test was found to be comparable to the specimens of Example 2. The shear strength of these specimens was somewhat higher than the 47,000 lbs./sq. in. obtained with the specimens of Example 2.

*Example 6*

A number of alloys containing admixtures of silicon, chromium, molybdenum and maganese were prepared and upon preparation were found to have substantially similar wetting and flow characteristics to the alloys of Examples 1–5, but it was determined that the melting point range of these quaternary alloys was more variable than that characteristic of alloys containing only one ingredient in addition to nickel and phosphorus. The melting point characteristics are enumerated in connection with the specific compositions that follow. An alloy containing 8% phosphorus, 7.5% silicon, 13% chromium and the balance nickel, had an observed melting point in the range of 1600° F. to 1850° F. An alloy containing 10% phosphorus, 5% molybdenum, 13% chromium and the balance nickel had an observed melting range between about 1650° F. and 1800° F. An alloy containing 8% phosphorus, 7.5% silicon, 12% molybdenum and the balance nickel has an observed melting range of about 1650° F. to 1800° F. An alloy containing 8% phosphorus, 7.5% silicon, 15% manganese and the balance nickel had an observed melting point range of about 1650° F. to about 1750° F. All of these alloys had excellent resistance to oxidation at 1600° F.

What is claimed is:

1. A brazing alloy having a melting point in the range of about 1600° F.–1850° F. consisting essentially of about 3 to about 15% phosphorus, at least 50% nickel and an alloying ingredient selected from the group consisting of 1%–12% silicon, 2% to 20% chromium, 1% to 20% manganese and .5%–18% molybdenum and mixtures of any two of said alloying ingredients.

2. An alloy in accordance with claim 1 wherein said alloying ingredient is silicon.

3. An alloy in accordance with claim 1 wherein said alloying ingredient is chromium.

4. An alloy in accordance with claim 1 wherein said alloying ingredient is manganese.

5. An alloy in accordance with claim 1 wherein said alloying ingredient is molybdenum.

6. An article comprising metal having at least two surfaces thereof joined by the brazing alloy defined in claim 1.

7. A brazing alloy consisting essentially of about 13% chromium, about 10.2% phosphorus and the balance nickel.

(References on following page)

References Cited by the Examiner

UNITED STATES PATENTS

| | | | |
|---|---|---|---|
| 1,680,058 | 8/28 | Merica et al. | 75—170 X |
| 2,403,926 | 7/46 | Johnson | 75—171 |
| 2,456,370 | 12/48 | Buck | 75—170 X |
| 2,585,819 | 2/52 | Moore et al. | 75—171 X |
| 2,714,760 | 8/55 | Boam et al. | 75—171 |

FOREIGN PATENTS

| | | |
|---|---|---|
| 487,263 | 6/38 | Great Britain. |

OTHER REFERENCES

"Zeitschrift fur anorganische und allgemeine Chemie" (Biltz et al.), band 237, pages 132–144, 1938 (page 144 relied on).

DAVID L. RECK, *Primary Examiner.*

CLYDE C. LE ROY, NATHAN MARMELSTEIN, RAY K. WINDHAM, ROGER L. CAMPBELL, MARCUS U. LYONS, *Examiners.*